US008322741B2

(12) United States Patent
Laslo et al.

(10) Patent No.: US 8,322,741 B2
(45) Date of Patent: Dec. 4, 2012

(54) APPARATUS FOR TILTING A WHEELCHAIR SEAT

(75) Inventors: David Nathan Laslo, Forty Fort, PA (US); John C. Carminati, Wyoming, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 320 days.

(21) Appl. No.: 12/718,252

(22) Filed: Mar. 5, 2010

(65) Prior Publication Data

US 2011/0215624 A1 Sep. 8, 2011

(51) Int. Cl.

| | |
|---|---|
| ***B62M 1/14*** | (2006.01) |
| ***B62M 1/00*** | (2010.01) |
| ***B60N 2/02*** | (2006.01) |

(52) U.S. Cl. ................ 280/250.1; 280/220; 297/362.14; 297/329; 297/DIG. 4

(58) Field of Classification Search ............... 280/250.1, 280/304.1, 220; 297/DIG. 4, 329, 330, 317, 297/322, 362.11, 362.14, 362.12

See application file for complete search history.

(56) References Cited

U.S. PATENT DOCUMENTS

| | | | | |
|---|---|---|---|---|
| 5,222,402 | A * | 6/1993 | White et al. | 74/89.14 |
| 5,718,442 | A | 2/1998 | Alexander et al. | |
| 6,032,976 | A | 3/2000 | Dickie et al. | |
| 6,126,186 | A * | 10/2000 | Mascari | 280/220 |
| 6,357,776 | B1 | 3/2002 | Goertzen et al. | |
| 2009/0230652 | A1* | 9/2009 | Landry et al. | 280/250.1 |
| 2009/0267310 | A1 | 10/2009 | Parkhurst, Sr. | |

FOREIGN PATENT DOCUMENTS

EP 0841051 A2 5/1998

* cited by examiner

*Primary Examiner* — Milton Nelson, Jr.
(74) *Attorney, Agent, or Firm* — Woodcock Washburn LLP

(57) ABSTRACT

A wheelchair having a tiltable and translatable seat for compensating for shifting of the center of gravity of an occupant during tilting is provided. Such a wheelchair includes a frame, a first actuator, a seat assembly, and a first rigid link. The first actuator includes opposing front and rear ends coupled to the frame, a rod that extends between the front and rear ends, and a connector that is capable of translating in response to actuation of the rod. The seat assembly is directly coupled to the connector of the first actuator. The first rigid link has a front end and a rear end. The link front end is pivotably coupled to the frame, and the link rear end is pivotably coupled to the seat assembly. The link may be oriented such that as the connector translates, the first link impels the chair to tilt.

13 Claims, 3 Drawing Sheets

APPARATUS FOR TILTING A WHEELCHAIR SEAT

TECHNICAL FIELD

The present invention generally relates to wheelchairs. More particularly, the present invention relates to an apparatus for tilting a wheelchair seat.

BACKGROUND

Wheelchairs and other personal mobility vehicles help people having reduced mobility to lead a more active lifestyle. Many conventional wheelchairs allow the incorporated chair assembly to be tilted. However, when the chair assembly is tilted, it is often necessary to keep the weight distribution within desired limits to prevent the wheelchair from tipping over.

When the chair assembly is moved from an upright to a tilted position, it is desirable to keep the horizontal center of gravity of the chair assembly with respect to the wheelchair frame as constant as possible. For example, U.S. Pat. No. 6,357,776 provides a wheelchair having a tilt assembly that adjusts the center of gravity of the chair assembly when the chair assembly is tilted.

Wheelchairs having a tilt assembly that adjusts the center of gravity of the chair assembly when the chair assembly is tilted are often synonymous with complex design, as additional components often are necessary to slide the chair assembly forward when it is moved to a tilted position. Also, the complexity of conventional tilt assemblies may require a relatively high seat-to-floor height, a relatively large motor to actuate the tilt assembly, and a center of gravity adjustment of the seat assembly that only partially compensates for the changed weight distribution of the wheelchair when the seat assembly is tilted. It would be desirable to have an improved apparatus for tilting a wheelchair seat.

SUMMARY

A wheelchair having a tiltable and translatable seat for compensating for shifting of the center of gravity of an occupant during tilting is provided. Such a wheelchair may include a frame, a first actuator attached to the frame, a seat assembly, and a first rigid link. The first actuator may include opposing front and rear ends coupled to the frame, a rod that extends between the front and rear ends, and a connector that is capable of translating in response to actuation of the rod. The seat assembly is adapted for receiving an occupant and is directly coupled to the connector of the first actuator. The first rigid link has a front end and a rear end. The link front end is pivotably coupled to the frame, and the link rear end is pivotably coupled to the seat assembly. The link may be oriented such that as the connector translates, the first link impels the chair to tilt.

These and various other advantages and features are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred embodiments of the invention.

DETAILED DESCRIPTION OF ILLUSTRATIVE EMBODIMENTS

Figure 1A:
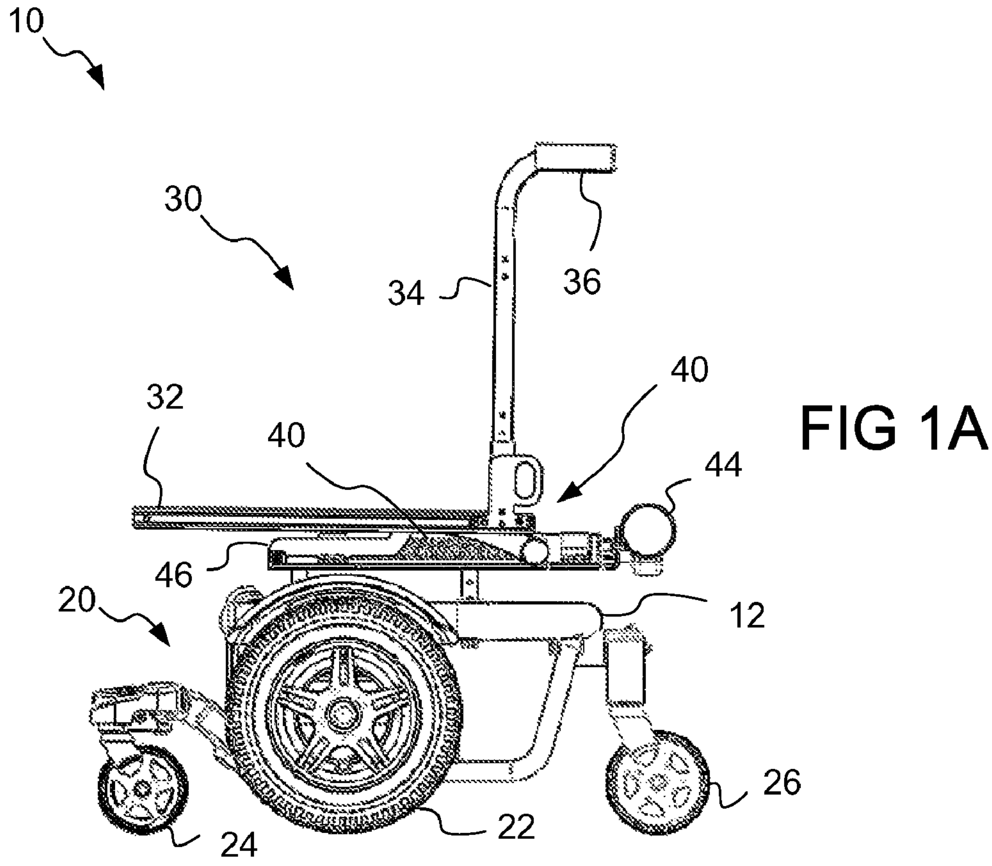
FIG. 1A is a left plan view of a wheelchair having a tiltable seat assembly according to an embodiment of the present invention, shown with the seat assembly in an upright position.
Figure 1B:
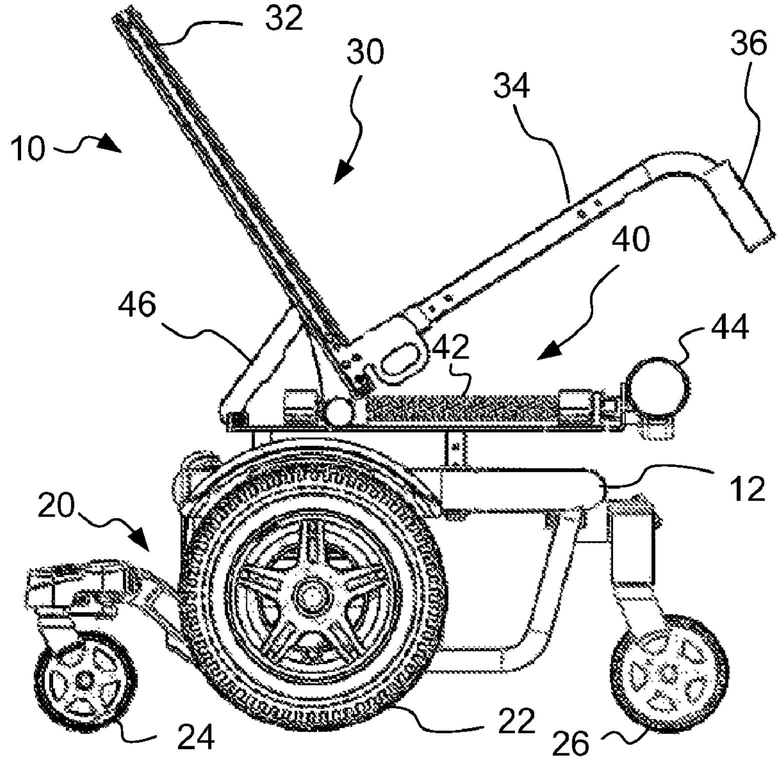
FIG. 1B is a left plan view of the wheelchair shown in FIG. 1A, with the seat assembly in a tilted position.

Referring to FIGS. 1A and 1B, a wheelchair 10 includes a frame 12, a pair of drive wheels 20 attached to frame 12, a seat assembly 30 adapted to carry an occupant, and a tilt assembly 40 for tilting and translating seat assembly 30 relative to frame 12.

Drive wheels 20 are attached proximate to the center of frame 12, making wheelchair 10 a mid-wheel drive wheelchair. Drive wheels 20 may be driven by a motor or manually (such as by the occupant manually rotating drive wheels 22 or by an assistant manually pushing wheelchair 10). While wheelchair 10 is shown as a mid-wheel driven wheelchair, it should be understood that wheelchair 10 may be constructed to be a front-wheel driven or a rear-wheel driven wheelchair. That is, drive wheels 20 may also be attached proximate to the front or rear of frame 12.

As shown in FIGS. 1A and 1B, wheelchair 10 also includes a pair of front caster wheel assemblies 24 extending forward of wheelchair 10, and a pair of rear caster wheel assemblies 26 extending rearward of wheelchair 10. Assemblies 24 and 26 may act as ant-tip mechanisms for wheelchair 10.

Seat assembly 30 includes a seat base 32 securely attached to tilt assembly 40, a seat back 34 coupled to seat base 32 that supports the back of an occupant while the occupant is sitting on seat base 32, and handles 36 for an assistant to manually push, steer, or maneuver wheelchair 10. To tilt seat assembly 30 from the upright or untilted position shown in FIG. 1A to the tilted position shown in FIG. 1B, the wheelchair occupant activates tilt assembly 40 (using, for example, a hand control mechanism not shown in the Figures) to tilt seat assembly 30 such that the front of seat base 32 is raised and the top of seat back 34 is lowered relative to frame 12. In addition to being tiltable, seat assembly 30 may also include a recline mechanism (not shown in the Figures) that pivots seat back 34 rearward relative to seat base 32. Seat assembly 30 may also include a lift mechanism (not shown in the Figures) that lifts seat assembly 30 upward relative to frame 12.

Referring now to FIGS. 2A-2E, tilt assembly 40 includes a pair of actuators 42, a motor 44 for driving actuators 42, and rigid links 46 pivotally coupled to frame 12 and seat assembly 30. Tilt assembly 40 further includes a seat bracket 50 for coupling seat base 32 of seat assembly 30 to tilt assembly 40 via adjustable extensions 52. Tilt assembly 40 may translate and tilt seat assembly 30 relative to frame 12. For example, as seat assembly 30 is translated forward by actuators 42, rigid links 46 will rotate counterclockwise thereby forcing seat assembly 30 to tilt backwards. Although rigid links 46 are shown as pivotally coupled to seat base 32 and the front of frame 12, rigid links 46 may be pivotally coupled to seat back 34 and the middle or rear of frame 12 (not shown in the Figures).

Rearward tilting of a wheelchair seat assembly about a single pivot point generally moves or shifts the horizontal center of gravity of the wheelchair occupant rearward relative to the wheelchair frame. To fully or partially compensate for this rearward movement of the horizontal center of gravity of the wheelchair occupant during tilting of seat assembly 30, actuators 42 translate seat assembly 30 forward during tilting. This forward translation of seat assembly 30, during tilting of seat assembly 30, shifts the horizontal center of gravity of a wheelchair occupant forward relative to the rearward shift in the horizontal center of gravity of the wheelchair occupant due to the rearward tilting of seat assembly 30.

The degree of forward compensation for the rearward movement of the horizontal center of gravity of the wheelchair occupant during tilting of seat assembly 30 that is provided by the forward translation of seat assembly 30 by actuators 42 may vary, depending on the weight of the wheelchair occupant relative to the weight of wheelchair 10, the stroke length of actuators 42, and the location of the coupling of rigid links 46 to the frame 12 and seat assembly 30. With such an arrangement, a user may get increased forward compensation as compared with other devices.

For example, when seat assembly 30 is in the tilted position shown in FIG. 1B, the horizontal center of gravity of the wheelchair including the occupant may be the same relative to the frame as it was in the upright position shown in FIG. 1A, or the horizontal center of gravity of the wheelchair including the occupant may be slightly rearward relative to the frame than it was in the upright position shown in FIG. 1A, depending on the aforementioned factors.

Each actuator 42 is shown as an acme threaded rod linear actuator that includes a rod 60 and a connector 70 that is configured to translate linearly in response to actuation of rod 60. While each actuator 42 is shown as an acme threaded rod linear actuator, each actuator may be any other type of closed length linear actuator that can be attached to frame 12 at both ends and can allow a connector to translate linearly between the ends, including, for example, nut and screw, linear ball screw, linear track, or linear slide. Tilt assembly 40 may include two actuators of the same type, or each actuator may be of a different type, for example, a first actuator may be a nut and screw type and a second actuator may be a ball screw type.

Each rod 60 is operatively coupled to motor 44 and rotatably coupled to a frame bracket 14 of frame 12 by a front pillow bearing 62 at a front end of actuator 42 and a rear pillow bearing 64 at a rear end of actuator 42. Front pillow bearing 62 and rear pillow bearing 64 are adapted to allow rotation of rod 60 about a longitudinal axis of rod 60. Each rod 60 includes a pulley 66 for transferring mechanical energy between rods 60 via a belt 68. As shown in the figures, actuator 42 is directly affixed to bracket 14 of frame 12 by front pillow bearing 62 and rear pillow bearing 42, although in other embodiments, actuator 42 is coupled to frame 12 through an intermediate structure, including, for example, brackets, pedestals, or a lift mechanism.

As shown in the figures, the longitudinal axis of motor 44 is substantially perpendicular to the longitudinal axis of rods 60, such that a helical gear or other mechanism may be used to transfer mechanical energy from rotation of an output shaft of motor 44 to the first rod 60. In other embodiments, the longitudinal axis of motor 44 is substantially parallel to the longitudinal axis of rods 60 (not shown in the Figures). In such embodiments in which the longitudinal axis of motor 44 is substantially parallel to the longitudinal axis of rods 60, an output shaft of motor 44 may be directly attached to the first rod 60.

As shown in the figures, a single motor 44 is included in wheelchair 10. In other embodiments, there are two motors 44, whereby a first motor 44 is operatively coupled to a first rod 60 and a second motor 44 is operatively coupled to a second rod 60. In such embodiments having two motors 44, pulleys 66 and belt 68 for transferring mechanical energy between rods 60 may be omitted from tilt assembly 40.

Each connector 70 includes a nut portion 72 that is tapped to mate with the threads of rod 60 and a pivot anchor portion 74 that is attached to nut portion 72 and pivotally coupled to seat bracket 50 at connector pivot 76.

In a preferred embodiment, the maximum stroke length of each connector 70 along its respective rod 60 is 9 inches, although in other embodiments, the maximum stroke length of each connector 70 may be any other length, including, for example, 3 inches, 5 inches, 7 inches, 10 inches, or 12 inches. The maximum stroke length of each connector 70 along its respective rod 60 will depend on factors such as the maximum desired design tilt angle of seat bracket 50 relative to frame bracket 14, the maximum power of motor 44, and the anticipated maximum weight of the wheelchair occupant.

Figure 2A:
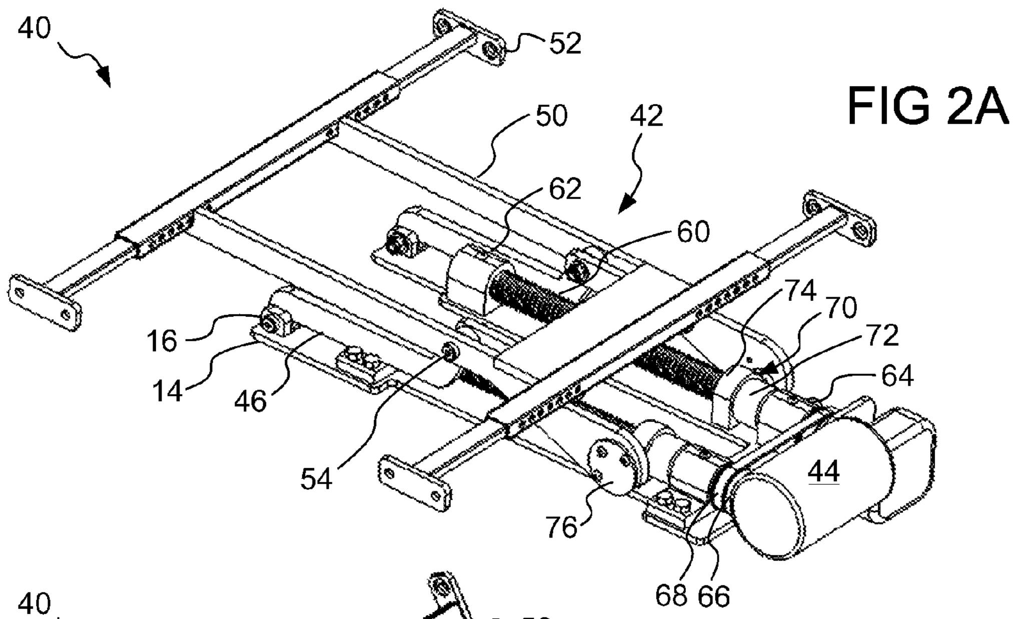
FIG. 2A is a back perspective view of the seat tilt assembly, shown with the tilt assembly in an untilted position.
Figure 2B:
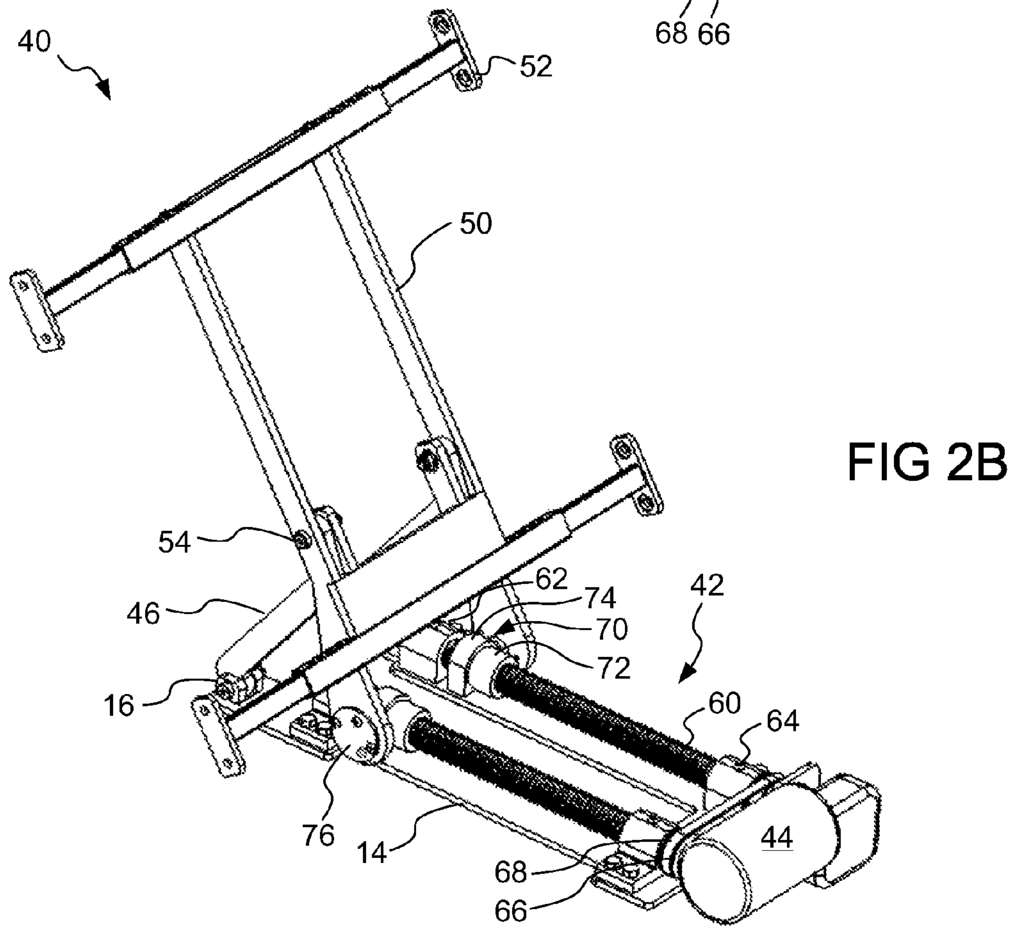
FIG. 2B is a back perspective view of the seat tilt assembly shown in FIG. 2A, with the tilt assembly in a tilted position.
Figure 2C:
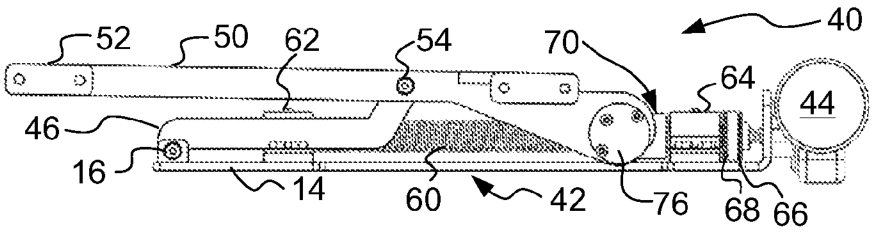
FIG. 2C is a left plan view of the seat tilt assembly shown in FIG. 2A, with the tilt assembly in an untilted position.
Figure 2D:
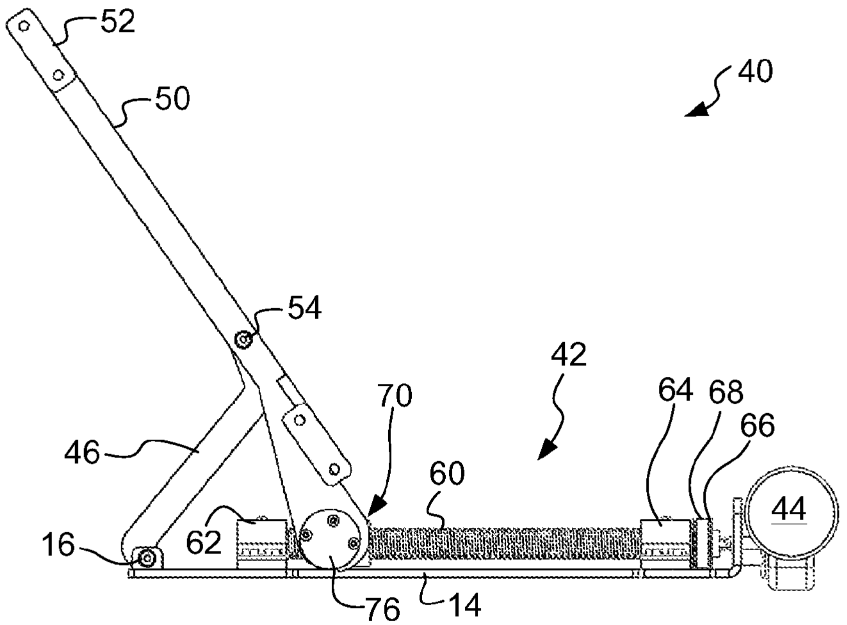
FIG. 2D is a left plan view of the seat tilt assembly shown in FIG. 2A, with the tilt assembly in a tilted position.
Figure 2E:
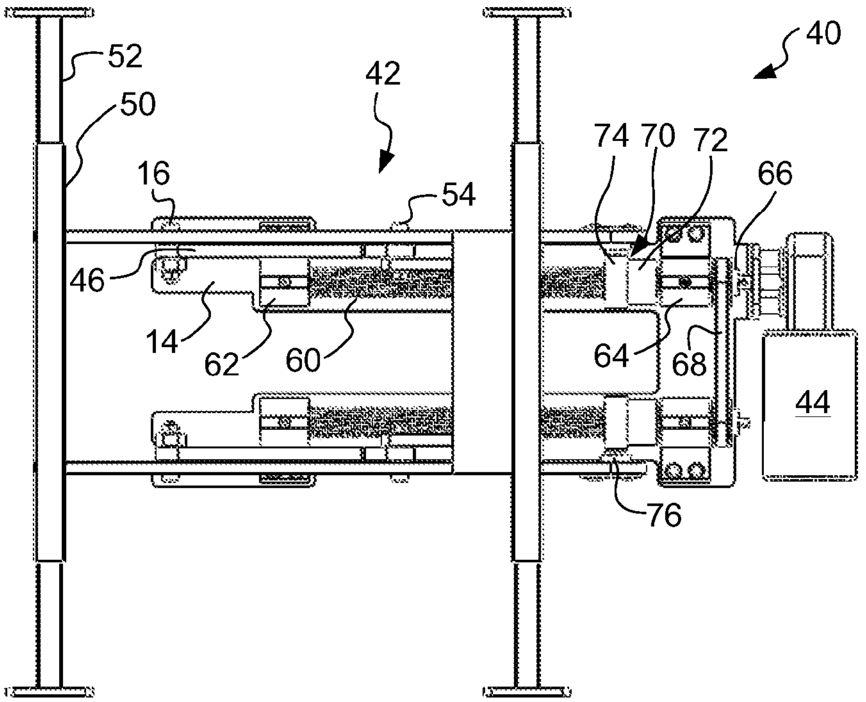
FIG. 2E is a top plan view of the seat tilt assembly shown in FIG. 2A, with the tilt assembly in an untilted position.

To actuate tilt assembly 40 from the untilted position shown in FIGS. 2A, 2C, and 2E to the tilted position shown in FIGS. 2B and 2D, the wheelchair occupant actuates motor 44 (using, for example, a hand control mechanism not shown in the Figures) to rotate a first rod 60 in a first direction, and the mechanical energy is transferred to a second rod 60 via belt 68 that connects a first and second pulley 66. The rotation of each rod 60 causes each respective connector 70 to linearly advance or translate along its rod 60 from rear pillow bearing 64 towards front pillow bearing 62.

The advancement of each connector 70 and its included connector pivot 76 along its respective rod 60 shortens the distance between each connector pivot 76 and a respective frame pivot 16 at which a respective rigid link 46 is pivotally coupled to frame bracket 14. The shortening of the distance between each connector pivot 76 and respective frame pivot 16 causes rigid links 46 to push up on seat bracket 50 at a seat pivot 54, thereby impelling seat bracket 50 to tilt by pivoting relative to frame bracket 14 of frame 12 about connector pivots 76.

As each connector 70 continues to translate towards front pillow bearing 62, the included angle between rigid links 46 and seat bracket 50 will decrease, and the included angles between (i) rigid links 46 and frame bracket 14 and (ii) seat bracket 50 and frame bracket 14 will increase. When each connector 70 has reached front pillow bearing 62, seat bracket 50 will have reached the maximum design tilt angle. In a preferred embodiment, the maximum design tilt angle of seat bracket 50 relative to frame bracket 14 is 55 degrees, although in other embodiments, the maximum design tilt angle of seat bracket 50 relative to frame bracket 14 may be any other angle, including, for example, 15 degrees, 25 degrees, 35, degrees, 45 degrees, 65 degrees, 75, degrees, or 90 degrees. The maximum design tilt angle of seat bracket 50 relative to frame bracket 14 will depend on the stroke length of rods 60 and the distances between frame pivot 16, seat pivot 54, and connector pivot 76.

To return or actuate tilt assembly 40 from the tilted position shown in FIGS. 2B and 2D to the untilted position shown in FIGS. 2A, 2C, and 2E, the wheelchair occupant actuates motor 44 to rotate the first rod 60 in a second direction opposite the first direction, and the mechanical energy is transferred to the second rod 60 via belt 68. The rotation of each rod 60 causes each respective connector 70 to linearly retreat or translate along its rod 60 from front pillow bearing 62 back towards rear pillow bearing 64.

The retreat or translation of each connector 70 and its included connector pivot 76 along its respective rod 60 towards rear pillow bearing 64 increases the distance between each connector pivot 76 and a respective frame pivot 16 at which a respective rigid link 46 is pivotally coupled to frame bracket 14. The increase of the distance between each connector pivot 76 and respective frame pivot 16 causes rigid links 46 to pull down on seat bracket 50 at seat pivot 54, thereby impelling seat bracket 50 to decrease the tilt angle by pivoting relative to frame bracket 14 of frame 12 about connector pivots 76.

As each connector 70 continues to translate towards its respective rear pillow bearing 64, the included angle between rigid links 46 and seat bracket 50 will increase, and the included angles between (i) rigid links 46 and frame bracket 14 and (ii) seat bracket 50 and frame bracket 14 will decrease. When each connector 70 has reached rear pillow bearing 62, seat bracket 50 will have reached the minimum design tilt angle. In a preferred embodiment, the minimum design tilt angle of seat bracket 50 relative to frame bracket 14 is zero degrees, although in other embodiments, the minimum design tilt angle of seat bracket 50 relative to frame bracket 14 may be any other angle, including, for example, 1 degrees, 2 degrees, 3, degrees, 4 degrees, 5 degrees, 10, degrees, or 15 degrees. The minimum design tilt angle of seat bracket 50 relative to frame bracket 14 will depend on the stroke length of rods 60 and the distances between frame pivot 16, seat pivot 54, and connector pivot 76.

In the embodiment shown in the figures, seat base 32 is attached to seat bracket 50 such that a best-fit plane defined by seat base 32 is substantially parallel to a best-fit plane defined by seat bracket 50, and seat back 34 extends away from seat pivot 76 substantially perpendicularly to seat bracket 50. In other embodiments, seat back 34 may be attached to seat bracket 50, while seat base 32 extends away from seat pivot 76 substantially perpendicularly to seat bracket 50, in which case tilt assembly 40 may be reversed relative to frame 12 so that a user's legs extend towards the front of wheelchair 10.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in wheelchair technology, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein. For example, any features or advantages related to the design of the tilt assembly with respect to discussion of a particular wheelchair embodiment can be applicable to any of the other wheelchair embodiments described herein.

What is claimed:

1. A wheelchair comprising:
a frame;
a first actuator comprising:
opposing front and rear ends coupled to the frame;
a rod that extends between the front and rear ends; and
a connector that is capable of translating along the rod in response to actuation of the rod;
a seat assembly, adapted for receiving an occupant, the seat assembly being directly coupled to the connector of the first actuator; and
a first rigid link,
wherein (i) the first rigid link has a front end and a rear end, (ii) the link front end is pivotably coupled to the frame, (iii) the link rear end is pivotably coupled to the seat assembly, and (iv) the link is oriented such that as the connector translates, the first link impels the chair to tilt.

2. The wheelchair of claim 1, wherein the connector translates relative to the frame.

3. The wheelchair of claim 1, wherein the seat assembly includes a base and a back, and the seat assembly is directly attached to the connector proximate a rear end of the seat base.

4. The wheelchair of claim 3, wherein the seat base is fixed relative to the seat back such that the base and back translate and tilt together.

5. The wheelchair of claim 1, wherein the connector is spaced apart from the frame during the majority of its translation.

6. The wheelchair of claim 1, wherein the actuator is directly affixed to the frame.

7. The wheelchair of claim 1, wherein the actuator is an acme threaded rod actuator.

8. The wheelchair of claim 1, further comprising a second actuator having:
opposing front and rear ends coupled to the frame;
a rod that extends between the front and rear ends; and
a connector that is capable of translating in response to actuation of the rod.

9. A wheelchair comprising:
a frame having a front and a back;
a first actuator and a second actuator, each actuator comprising:
a rod that extends between the front and the back of the frame along a first direction; and
a connector that is configured to translate along the rod in response to actuation of the rod;
a motor configured to drive the first and second actuators to thereby move the connectors along the rods; and
a first rigid link and a second rigid link that are each rotatably coupled to the frame at a respective first end, and rotatably coupled to a respective bracket at a second end, wherein movement of the connectors along the rods and toward the first ends of the first and second rigid links causes the rigid links to push up on the brackets to thereby cause the brackets to move along a direction that has a direction component that is perpendicular to the first direction.

10. The wheelchair of claim 9, wherein the connectors translate relative to the frame.

11. The wheelchair of claim 9, wherein the connectors are spaced apart from the frame during the majority of their translation.

12. The wheelchair of claim 9, wherein the actuators are acme threaded rod actuators.

13. The wheelchair of claim 9, wherein the motor is transverse to the direction of translation.

* * * * *